(12) United States Patent
Copty et al.

(10) Patent No.: US 10,649,887 B2
(45) Date of Patent: May 12, 2020

(54) CO-VERIFICATION OF HARDWARE AND SOFTWARE

(71) Applicant: International Business Machines Corporation, Armonk, NY (US)

(72) Inventors: Fady Copty, Nazareth (IL); Dov Murik, Haifa (IL); Sharon Keidar Barner, Megiddo (IL)

(73) Assignee: International Business Machines Corporation, Armonk, NY (US)

(*) Notice: Subject to any disclaimer, the term of this patent is extended or adjusted under 35 U.S.C. 154(b) by 160 days.

(21) Appl. No.: 15/905,853

(22) Filed: Feb. 27, 2018

(65) Prior Publication Data
US 2019/0266074 A1 Aug. 29, 2019

(51) Int. Cl.
*G06F 11/00* (2006.01)
*G06F 11/36* (2006.01)

(52) U.S. Cl.
CPC ...... *G06F 11/3676* (2013.01); *G06F 11/3644* (2013.01); *G06F 11/3684* (2013.01)

(58) Field of Classification Search
CPC .... G06F 11/261; G06F 11/263; G06F 11/273; G06F 11/277; G06F 11/3644; G06F 11/3648; G06F 11/3676; G06F 11/3684
See application file for complete search history.

(56) References Cited

U.S. PATENT DOCUMENTS

| | | | |
|---|---|---|---|
| 6,230,114 B1* | 5/2001 | Hellestrand | G06F 11/261 703/13 |
| 7,089,534 B2* | 8/2006 | Hartman | G06F 11/3684 714/E11.207 |

(Continued)

FOREIGN PATENT DOCUMENTS

CN 101859274 6/2013

OTHER PUBLICATIONS

Bekrar et al., "Finding Software Vulnerabilities by Smart Fuzzing", 2011 Fourth IEEE International Conference on Software Testing, Verification and Validation, 2011, pp. 427-430.

(Continued)

*Primary Examiner* — Elmira Mehrmanesh
(74) *Attorney, Agent, or Firm* — Ziv Glazberg (57) ABSTRACT

An apparatus, a computer program product and a method for co-verification of systems comprising software and hardware components. The method comprises obtaining an over-approximation of the system that over-approximates the software or the hardware by using a non-deterministic version thereof; performing simulation of the over-approximation of the system; and utilizing an outcome of the simulation to guide a co-simulation of the system. The co-simulation comprises instrumenting the software to identify whether the coverage goals are reached during execution, generating a test input for the system, simulating execution of the test input by the instrumented software, wherein during said simulating, stimuli provided from the instrumented software to underlying hardware is provided to a hardware simulator that is configured to simulate the hardware-under-test; determining a coverage of the execution of the test input, and utilizing the coverage information in a successive iteration of the method.

9 Claims, 6 Drawing Sheets

(56) References Cited

U.S. PATENT DOCUMENTS

| | | | | |
|---|---|---|---|---|
| 7,340,386 | B2* | 3/2008 | Pal | G06F 11/261 |
| | | | | 703/13 |
| 7,865,340 | B2* | 1/2011 | Fine | G06F 17/504 |
| | | | | 703/2 |
| 8,209,667 | B2* | 6/2012 | Eisner | G06F 9/44589 |
| | | | | 714/38.1 |
| 8,448,147 | B2* | 5/2013 | Raz | G06F 11/3676 |
| | | | | 714/34 |
| 8,819,493 | B1* | 8/2014 | Gaudette | G06F 11/263 |
| | | | | 702/123 |
| 8,924,937 | B1 | 12/2014 | Andrews et al. | |
| 9,323,597 | B2 | 4/2016 | Eddington | |
| 9,372,772 | B1 | 6/2016 | Balan et al. | |
| 9,836,372 | B1* | 12/2017 | Khan | G06F 11/263 |
| 10,324,816 | B2* | 6/2019 | Barak | G06F 11/3672 |
| 2003/0093256 | A1* | 5/2003 | Cavanagh | G06F 17/5022 |
| | | | | 703/14 |
| 2011/0218794 | A1* | 9/2011 | Chockler | G06F 9/44 |
| | | | | 703/20 |
| 2012/0060064 | A1* | 3/2012 | Keidar-Barner | G06F 11/3608 |
| | | | | 714/50 |
| 2015/0039546 | A1* | 2/2015 | Alvarez-Icaza | G06N 3/0472 |
| | | | | 706/27 |

OTHER PUBLICATIONS

Rowson, "Hardware/Software Co-Simulation", 31st Design Automation Conference, 1994, pp. 439-440.

Cadence, Palladium Hybrid. Available at: https://www.cadence.com/content/cadence-www/global/en_US/home/tools/system-design-and-verification/acceleration-and-emulation/palladium-hybrid.html.

Powell et al., "HW/SE Co-Simulation", Introduction to VLSI and ASIC Design, Winter 2000. Available at: http://www.frobnotz.com/cosim/cosim.html.

* cited by examiner

CO-VERIFICATION OF HARDWARE AND SOFTWARE

TECHNICAL FIELD

The present disclosure relates to system verification in general, and to co-verification of hardware and software, in particular.

BACKGROUND

System Verification is the evaluation of whether or not a system complies with certain requirements, such as regulations, specifications, imposed conditions, properties, goals, or the like. System verification may be used as an instrumental means for proving or disproving the correctness of intended algorithms underlying the system with respect to the certain requirements.

In the development phase, verification procedures involve performing special tests to model or simulate a portion, or the entirety, of a system, then performing a review or analysis of the modeling results. In the post-development phase, verification procedures involve regularly repeating tests devised specifically to ensure that the system continues to meet the initial requirements as time progresses.

Every aspect of the system: hardware, software and communications, should be verified and thoroughly tested before the system is used. The integration between the software and the hardware should also be verified. After successful testing, systems will need regular maintenance to ensure they will perform effectively when they are needed.

Software verification is the process of checking that the output of each phase of the software development process effectively carry out what its corresponding input artifact specifies.

Hardware Verification is the process of checking that a given design correctly implements the specification. It is recognized as the largest task in silicon development and as such has the biggest impact on the key business drivers of quality, schedule and cost.

BRIEF SUMMARY

One exemplary embodiment of the disclosed subject matter is a method comprising obtaining a combined coverage model for a system, wherein the system comprises a software-under-test and a hardware-under-test that is capable of executing the software-under-test, wherein the combined coverage model comprises coverage goals for the software-under-test and coverage goals for the hardware-under-test; performing a co-simulation of the system based on the combined coverage model, wherein said performing the co-simulation comprises: instrumenting the software-under-test to identify whether the coverage goals of the software-under-test are reached during execution, whereby obtaining an instrumented software; generating a test input by a test generator, wherein said generating is based on the combined coverage model, wherein the test input is a test input for the software-under-test; simulating execution of the test input by the instrumented software, wherein during said simulating, stimuli provided from the instrumented software to underlying hardware is provided to a hardware simulator that is configured to simulate the hardware-under-test; determining a coverage of the execution of the test input, wherein said determining the coverage comprises detecting, using the instrumented software, coverage events relating to the coverage goals of the software-under-test and detecting, using the hardware simulator, coverage events relating to the coverage goals of the hardware-under-test; and wherein said generating, executing and determining are performed repeatedly, wherein a determined coverage in an iteration is utilized in said generating in a successive iteration.

Optionally, the method further comprises: obtaining an over-approximation of the system, wherein the over-approximation of the system over-approximates one of the software-under-test and hardware-under-test; performing simulation of the over-approximation of the system; and utilizing an outcome of the simulation to guide the co-simulation of the system.

Optionally, said utilizing comprises determining, based on the outcome of the simulation, additional coverage goals for the system, wherein the test generator is guided to generate the test input further based on the additional coverage goals.

Optionally, the over-approximation of the system over-approximates the hardware-under-test, wherein the over-approximation comprises a non-deterministic hardware instead of the hardware-under-test; wherein said performing the simulation further comprises: generating a software test input by a second test generator, wherein said generating the software test input is based on the coverage goals for the software-under-test; simulating execution of the software test input by the instrumented software, wherein during said simulating, a result of a stimuli provided from the instrumented software to underlying hardware is determined non-deterministically; determining a coverage of the execution of the software test input, wherein said determining the coverage of the execution of the software test input comprises detecting, using the instrumented software, additional coverage events relating to the coverage goals of the software-under-test; and wherein said utilizing the outcome comprises utilizing the software test input and the coverage of the execution of the software test input in said generating the test input during the co-simulation.

Optionally, said utilizing the outcome comprises: determining, based on the coverage of the execution of the software test input, additional coverage goals for the software-under-test; and wherein said generating the test input is performed based on the combined coverage model and the additional coverage goals.

Optionally, said generating the test input is performed based on the software test input, wherein the test generator is configured to generate the test input by modifying the software test input, whereby providing an improved initial starting point for the co-simulation based on the software test input.

Optionally, the over-approximation of the system over-approximates the software-under-test, wherein the over-approximation comprises a non-deterministic software instead of the software-under-test; wherein said performing the simulation further comprises: testing the over-approximation of the system using a hardware testing module, whereby obtaining coverage information regarding said testing, wherein the coverage information comprises coverage events monitored during said testing; determining, based on the coverage events, additional coverage goals for the hardware-under-test; and wherein said utilizing the outcome comprises performing said co-simulation of the system further based on the additional coverage goals.

Optionally, said generating the test input is further performed based on the additional coverage goals; and wherein said determining the coverage further comprises detecting coverage events relating to the additional coverage goals of the hardware-under-test.

Another exemplary embodiment of the disclosed subject matter is a computer program product comprising a non-transitory computer readable storage medium retaining program instructions, which program instructions when read by a processor, cause the processor to perform a method comprising: obtaining a combined coverage model for a system, wherein the system comprises a software-under-test and a hardware-under-test that is capable of executing the software-under-test, wherein the combined coverage model comprises coverage goals for the software-under-test and coverage goals for the hardware-under-test; performing a co-simulation of the system based on the combined coverage model, wherein said performing the co-simulation comprises: instrumenting the software-under-test to identify whether the coverage goals of the software-under-test are reached during execution, whereby obtaining an instrumented software; generating a test input by a test generator, wherein said generating is based on the combined coverage model, wherein the test input is a test input for the software-under-test; simulating execution of the test input by the instrumented software, wherein during said simulating, stimuli provided from the instrumented software to underlying hardware is provided to a hardware simulator that is configured to simulate the hardware-under-test; determining a coverage of the execution of the test input, wherein said determining the coverage comprises detecting, using the instrumented software, coverage events relating to the coverage goals of the software-under-test and detecting, using the hardware simulator, coverage events relating to the coverage goals of the hardware-under-test; and wherein said generating, executing and determining are performed repeatedly, wherein a determined coverage in an iteration is utilized in said generating in a successive iteration.

Yet another exemplary embodiment of the disclosed subject matter is an apparatus comprising said processor and a memory, wherein said memory retaining the computer program product.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to perform a hybrid verification of the hardware and the software of a computer system together in early the design process. The term hybrid system may be utilized to describe a system that comprises both a hardware and a software.

In some exemplary embodiments, when verifying a hybrid system that comprises a hardware and a software components, the hardware and software may be verified separately and then tested together. Software verification may be performed by executing the software and observing its behavior while treating the hardware as a black box, using static analysis without executing the software, or the like. In some cases, the software verification may be performed before the hardware is built. Hardware verification may involve making sure that the hardware performs correctly in response to outside stimuli and executing the software. After performing the software verification and the hardware verification separately, the hybrid system may be tested to verify that executing the software and the hardware meets the requirements. However, such testing may testing may be prone to low coverage and human error. Even when trying to perform a verification using co-simulation of both of the hardware and the software, engineers may be able to control inputs of the software only. As a result, a high hardware coverage may be hard to achieve.

Additionally or alternatively, formal verifications methods may be used to verify the hybrid system. Formal verifications methods may intend to prove or disprove the correctness of intended algorithms underlying a system with respect to a certain formal specification or property, using formal methods of mathematics. The verification of the hybrid system may be performed by providing a formal proof on an abstract mathematical model of the system, the correspondence between the mathematical model and the nature of the hybrid system being otherwise known by construction. However, formal verification methods may be limited to small size systems.

As a result, hardware verification engineers and hardware designers may be required to spend a lot of time debugging and fixing problems that may not occur when the hardware and software are executed together.

One technical solution is to automatically generate test inputs that sufficiently cover both the hardware and the software coverage requirements.

In some exemplary embodiments, the automatic test generation may be performed by combining software verification methods with hardware verification methods, to iteratively improve the coverage achieved by the generated tests.

In some exemplary embodiments, a combined coverage model of the hybrid system may be obtained as a basis for the co-verification. The combined coverage model may comprise coverage goals for the software of the hybrid system and coverage goals for the hardware of the hybrid system that is capable of executing the software. The combined coverage model may be provided by a designer of the hybrid system, using standard coverage models, or the like.

In some exemplary embodiments, the hybrid system may be co-simulated based on the combined coverage model. The software may be instrumented to identify whether the software coverage goals are reached during execution. The instrumentation may be implemented as code instructions that monitor components of the hybrid system during the execution of the software.

In some exemplary embodiments, test inputs for the hybrid system may be generated based on the combined coverage model. The test inputs may be generated using an automated software testing technique, such as fuzz testing. As an example, the test inputs may be generated using an instrumented fuzzer that employs a compile-time instrumentation and genetic algorithms to automatically generate interesting test inputs that trigger new internal states in the software.

In some exemplary embodiments, execution of the test input by the instrumented software may be simulated by a hardware simulator that is configured to simulate the hardware of the hybrid system. Stimuli provided during the simulation from the instrumented software to underlying hardware may be transmitted to the hardware simulator. The hardware simulator may be a software package that is configured to compile and simulate hardware expressions written in one of the hardware description languages.

In some exemplary embodiments, a coverage of the execution of the test input may be determined. Coverage events relating to the software coverage goals may be detected using the instrumented software. The instrumentation may be designed to enable in addition to monitoring the coverage goals, diagnosing errors and tracing information. Coverage events relating to the hardware coverage goals may be detected using the hardware simulator. The hardware simulator may be configured to simulate hardware coverage events predicting behavior of the hardware that should be verified. A determination of a coverage of such events may be performed by instrumentations of the hardware simulator. The hardware simulator may be instrumented similar to instrumentation performed on the software in order to enable monitoring of the hardware coverage goals. Additionally or alternatively, coverage of the of the hardware coverage goals may be determined by monitoring the execution of the hardware simulator. The software and the hardware coverage may be combined and utilized iteratively as an accumulative coverage model for generating the test inputs.

In some exemplary embodiments, an over-approximation of the hybrid system that over-approximates the software or the hardware may be simulated. An outcome of the simulation may to be used to guide the test generation process and the simulation of the hybrid system, and to provide an improved initial starting point for the co-simulation. As an example, additional coverage goals for the hybrid system may be determined based on the outcome. The test generator may be guided to generate the test inputs based on an expanded coverage model comprising the combined coverage model and the additional coverage goals. Additionally or alternatively, the outcome of the simulation may be used during the a next iteration of the co-simulation, determining coverage hints to guide the verification process, or the like.

In some exemplary embodiments, the over-approximation of the hybrid system may over-approximate the hardware of the hybrid system. The hardware of the system may be over-approximated by replacing the hardware with a non-deterministic hardware, to enable verifying only the software based on the combined coverage model. Software test inputs may be generated based on the software coverage goals. The software test inputs may be generated using the same testing techniques used to generate the test inputs for the hybrid system, or any other testing technique that is based on a coverage model. The software may be instrumented to identify whether the software coverage goals are reached during execution. A hardware simulator simulating the non-deterministic hardware may be utilized to simulate execution of the software test input by the instrumented software. A coverage of the execution of the software test input may be determined and additional coverage events relating to the software coverage goals may be detected. Software tests with an enhanced coverage, may be utilized as templates for generating test input such as by modifying the software test, by fuzzing the software test, or the like.

Additionally or alternatively, the over-approximation of the hybrid system may over-approximate the software of the hybrid system, by replacing the software with a non-deterministic software. The over-approximation of the hybrid system may be tested using hardware testing module. The hardware testing module may be configured to test the behavior of the hardware, without being limited to events invoked by the specific software. Coverage information regarding said testing may be analyzed to determine additional coverage goals of the hardware. The additional coverage goals may be utilized in the co-simulation of the hybrid system. The coverage of the test inputs may be further determined with respect to the additional hardware coverage goals.

One technical effect of utilizing the disclosed subject matter is to provide for an enhanced co-verification of software-hardware systems, while obtaining a wider coverage model. By utilizing fuzz testing techniques, new tests may be generated based on interesting tests already found. Fuzz testing may be combined with verification methods on the hardware only or on the software only to create new partial tests inputs that can direct fuzz testing to new components. Such partial tests inputs may be used as input to the test generator and maximize the probability to explore uncovered components of the system, may be utilized to determine coverage hints for additional testing or test generation, or the like.

Another technical effect of utilizing the disclosed subject matter is to enable hardware developers to focus their verification efforts only on hardware issues relevant to the specific software coupled with the hardware. This will eliminate false positive results of bugs in the hybrid system and unnecessary debug and fix time, reducing the product's time to market.

As yet another technical effect of utilizing the disclosed subject matter is to enable utilizing sophisticated simulation, emulation, and formal verification tools for a post-silicon validation and debug. In contrast to pre-silicon process, where engineers can test devices in a virtual environment, post-silicon validation tests occur on actual devices running at-speed in commercial, real-world system boards using logic analyzer and assertion-based tools. Consequently, it may be imperative that the new chip function in full and perfect compliance to its specification, and be delivered to the market within tight consumer windows. Post-silicon validation is therefore a highly leveraged step in successful design implementation. The proposed solution may be utilized for post-silicon validation, to enable a continuous update of the validation of the products based on simultaneous co-validation of both of the hardware and software parts of the complex systems, while focusing on functional validation of the system as whole, applying the disclosed subject matter on post-silicon validation may enable detection and diagnosis of functional bugs that may survive into manufactured silicon, so that they do not escape into the released system. The bugs in this category are often system-level bugs and rare corner-case situations buried deep in the design state space: since these problems may encompass many design modules, they may be difficult to identify with pre-silicon tools, characterized by limited scalability and performance. Furthermore, applying the disclosed subject matter on post-silicon validation, may benefit from very high raw performance, since tests are executed directly on manufactured silicon. At the same time, it may pose several challenges to traditional validation methodologies, because of the limited internal observability and difficulty of applying modifications to manufactured silicon chips. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1:
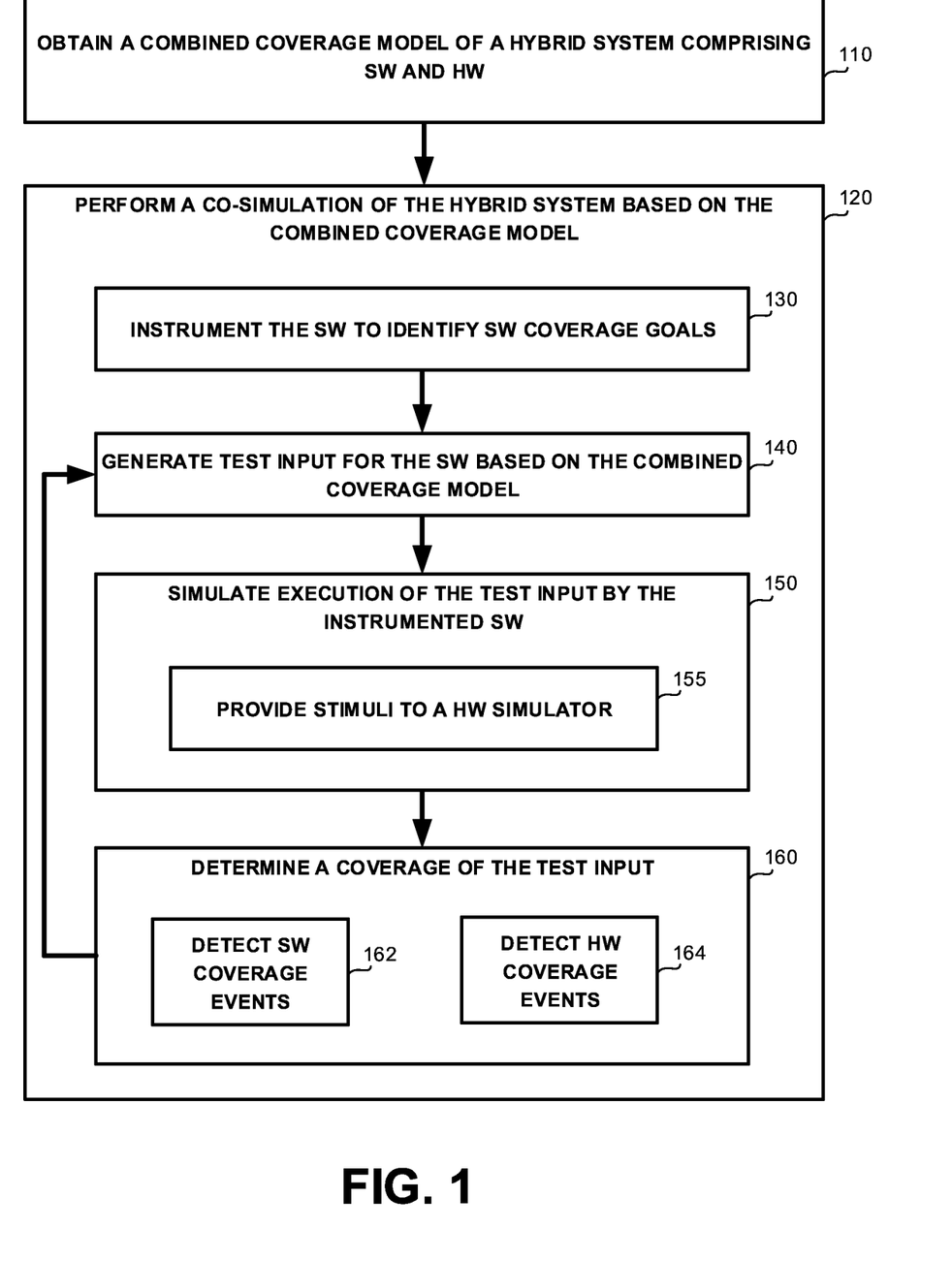
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

On Step 110, a combined coverage model for a hybrid system may be obtained. In some exemplary embodiments, the hybrid system may comprise a software-under-test and a hardware-under-test that is capable of executing the software-under-test, wherein the combined coverage model comprises coverage goals for the software-under-test and coverage goals for the hardware-under-test.

In some exemplary embodiments, the coverage goals may be determined by developers of the software or the hardware. The developers may add assertions to the code to measure the degree to which the code is executed when a particular test suite runs. Additionally or alternatively, a standard coverage model may be utilized, or methods that automatically create hardware coverage goals may be applied. As an example, a standard coverage model may be generated based on checking whether every line of the code can be exercised by the test corpus.

In some exemplary embodiments, the coverage goals for the hardware-under-test may be determined based on a design of the hardware. The coverage model may identify physical portions of the hardware-under-test that may not be properly exercised. As an example, the coverage goals for the hardware-under-test may be determined based on circuit-structure-based toggle coverage, which may be configured to identify whether each binary node in a circuit of the hardware switches from 0 to 1 or 1 to 0 at some point during a simulation. As another example, the coverage goals for the hardware-under-test may be determined based on state transition graphs of the hardware-under-test, which may require state, transition, or limited path coverage on a finite state machine (FSM) representation of the hardware-under-test.

In some exemplary embodiments, the coverage-goals for the software-under-test may be determined based on rules or requirements that a test suit need to satisfy, such as function coverage goals that may determine whether each function (or subroutine) in the software-under-test has been called, statement coverage goals that may determine whether each statement in the software-under-test has been executed, branch coverage goals that may determine whether each branch of each control structure in the software-under-test has been execute, condition coverage goals that may determine whether each Boolean sub-expression in the software-under-test is evaluated both to true and false, or the like. Additionally or alternatively, the coverage-goals for the hardware-under-test may be also determined based on rules or requirements that a test suit need to satisfy in the hardware-ender-test, such as circuit-structure-based toggle coverage, which may be configured to identify whether each binary node in a circuit of the hardware switches from 0 to 1 or 1 to 0 at some point during execution of the test, path coverage on a finite state machine (FSM) representation of the hardware-under-test, or the like.

On Step 120, a co-simulation of the hybrid system based on the combined coverage model may be performed. In some exemplary embodiments, the co-simulation may be configured to imitate the operation of the hybrid system over time. The co-simulation may simulate a run of a test of the hybrid system by the software-under-test executed on the hardware-under-test. It may be appreciated that the term co-simulation should be interpreted as covering also emulating the execution of the hybrid system, executing the hybrid system in a testing setup, or the like.

On Step 130, the software-under-test may be instrumented to identify whether the coverage goals of the software-under-test are reached during execution. An instrumented software may be obtained. In some exemplary embodiments, instrumentation code may be added to the software-under-test, as source instrumentation, binary instrumentation, or the like. The instrumentation may enable mentoring and measuring the level of performance of the software-under-test with respect to the coverage goals.

On Step 140, a test input may be generated based on the combined coverage model. The test input may be designed to satisfy coverage goals of the combined coverage model. In some exemplary embodiments, the test input may be configured to be executed by the software-under-test. The test input may be designed to test both software coverage goals and hardware coverage goals.

In some exemplary embodiments, the test input may be generated by a test generator. The test generator may be configured to utilize a test generation method that generates test inputs based on coverage models, such as automatic model-based test generation, symbolic model checking, or the like.

In some exemplary embodiments, the test generator may be configured to generate the test input using fuzz testing. Fuzz testing may be a software testing technique that involves testing the software-under-test by providing invalid, unexpected, or random data as input. The test generator may be configured to monitor the software-under-test to determine exceptions such as vulnerabilities, crashes, failing built-in code assertions, for finding potential memory leaks, or the like.

In some exemplary embodiments, the test generator may be configured to generate the test input by fuzzing a sample input. The sample input may be an input associated with the software-under-test that may be a basis for generating the test input, such as an initial test input of the software-under-test. Additionally or alternatively, any type of input that may provide information about the structure of the test input may be utilized by the test generator for the fuzz testing, such as file formats, network protocols, environment variables, sequences of Application Program Interface (API) calls, particular interleaving of threads, or the like.

In some exemplary embodiments, the test generator may be configured to generate the test input based on the combined coverage model by employing heuristic approaches to input generation to improve the coverage of the coverage goals. In some exemplary embodiments, generated inputs may be measured against the combined coverage model and used to update the heuristic.

On Step 150, execution of the test input by the instrumented software may be simulated. An execution of the instrumented software by the hardware-under-test may be simulated.

On Step 155, stimuli provided during the simulating, from the instrumented software to underlying hardware may be provided to a hardware simulator that is configured to simulate the hardware-under-test. In some exemplary embodiments, the hardware simulator may be configured to compile and simulate the hardware-under-test specification written in one of the hardware description languages.

On Step 160, a coverage of the execution of the test input may be determined. In some exemplary embodiments, the coverage of the execution may be presented by a combined coverage metric.

It may be appreciated that that the combined coverage model obtained in coverage of the execution may also be represented by a coverage metric of the same structure as the combined coverage metric. Such a metric may be a combination of a coverage metric of the hardware-under-test and a coverage metric of the software-under-test. In some exemplary embodiments, the software coverage metric and the hardware coverage metric may be combined to determine a combining coverage metric. As an example, the hardware coverage metric may be appended to the software coverage metric.

In some exemplary embodiments, the coverage may be determined using instrumentations added to the software-under-test in Step 130. As an example, an edge hit count array of the size of the coverage goals number (e.g. N) may be used to measure coverage of a specific run of the software-under-test, or the instrumented version thereof. On Step 130, instrumentation at the beginning of each basic block may be added to the software-under-test. Each basic block may be associated with a coverage goal. The instrumentation may include a location identifier (such as is a random number between 0 and N−1), and a short sequence of instructions, which increases the edge hit count array for the edge that led to the current basic block.

The hardware coverage metric may be obtained by the simulation of the hardware-under-test by the hardware simulator. The hardware simulator may be configured to determine which of the coverage events associated with the coverage goals of the hardware-under-test are satisfied, such as by collecting hit count array representing the count of coverage events. The hardware simulator may be instrumented in accordance with the design of the hardware-under-test and the hardware coverage goals to count the number of "hits" on each part of the design.

Additionally or alternatively, the instrumentations and the coverage metrics may be created in accordance with the test generator utilized in Step 140. As an example, the test generator may be an American Fuzzy Lop (AFL) Fuzzer that employs a compile-time instrumentation and genetic algorithms to automatically discover interesting test cases that trigger new internal states in target software. The AFL Fuzzer may be designed to improves the functional coverage for the fuzzed code, in accordance with the combined coverage model. The same metric and instrumentation used to determine the coverage by the AFL Fuzzer, may be utilized to determine the coverage of the execution of the test input.

On Step 162, coverage events relating to the coverage goals of the software-under-test may be detected using the instrumented software. In some exemplary embodiments, coverage events relating to the coverage goals of the software-under-test may be added to the combined coverage model to be determined in the next iterations of test generation.

On Step 164, coverage events relating to the coverage goals of the hardware-under-test may be detected using the hardware simulator. In some exemplary embodiments, coverage events relating to the coverage goals of the hardware-under-test may be added to the combined coverage model to be determined in the next iterations of test generating.

As an example, inputs that cause the instrumented software to execute a single path but differ in the location hit counts they trigger in the simulated hardware, may be considered as interesting inputs and therefore may be determined as a coverage event for further exploration.

In some exemplary embodiments, Step 120 (including sub-Steps 130-164) may be repeated while utilizing an augmented combined coverage model that comprises the combined coverage model and the coverage events determined on Steps 162 and 164. Generated test inputs may be measured against the coverage model and used to update the heuristic used for the fuzz testing. In some exemplary embodiments, the fuzz testing may be performed using different fuzzing methods at different iterations based on the heuristic. In some exemplary embodiments, Step 120 may be repeated until a bug is determined in the hybrid system. The bug may be reported to a user or a developer of the hybrid system for fixing or further development. Additionally or alternatively, Step 120 may be repeated until achieving a threshold of coverage, such as 100% coverage of the combined coverage model, 95% coverage of the combined coverage model, or the like.

Additionally or alternatively, the whole method may be repeated using the coverage of interesting test inputs determined in Step 160 as a combined coverage model. Interesting test inputs may be test input with high coverage (e.g., above a predetermined threshold), tests invoking new events, tests determined by a user as interesting, or the like.

Figure 2A:
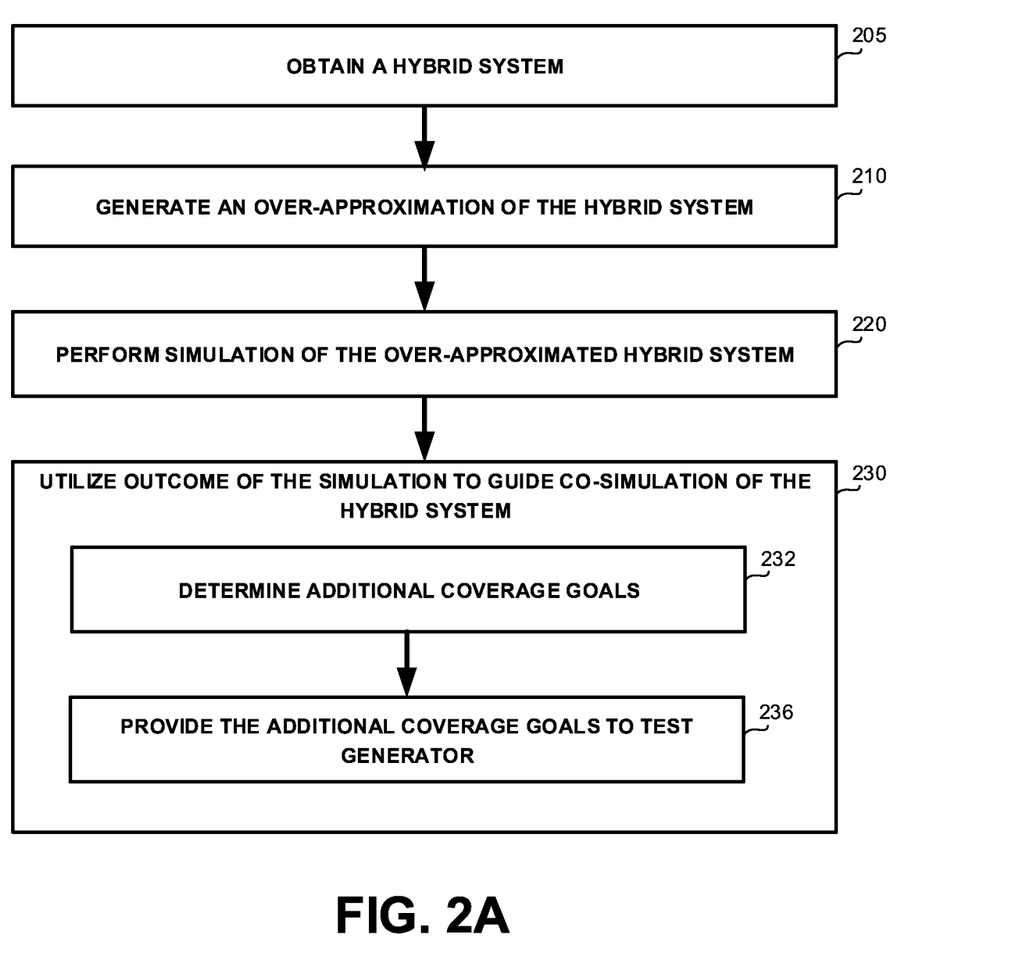
FIGS. 2A-2C show flowchart diagrams of a method, in accordance with some exemplary embodiments of the disclosed subject matter.

Referring now to FIG. 2A showing a flowchart diagram of a method, in accordance with some exemplary embodiments of the disclosed subject matter.

On Step 205, a hybrid system may be obtained. The hybrid system may comprise a software-under-test and a hardware-under-test that is capable of executing the software-under-test. In some exemplary embodiments, a depiction of the software-under-test may be provided in a software programming language, such as C, C++, C #, Java, JavaScript, PHP, Ruby, assembly, or the like. In some exemplary embodiments, a depiction of the hardware-under-test may be provided using a hardware description language, that describes the structure and behavior of the hardware-under-test. The hardware description language may be Verilog, netlist, VHDL, systemC, or the like.

In some exemplary embodiments, a combined coverage model of the hybrid system may comprise coverage goals for the software-under-test and coverage goals for the hardware-under-test. The combined coverage model may be the combined coverage model obtain on Step 110 of FIG. 1.

On Step 210, an over-approximation of the hybrid system may be generated. In some exemplary embodiments, the over-approximation of the hybrid system may over-approximate one of the software-under-test and hardware-under-test. The over-approximation of the software-under-test or hardware-under-test may be accomplished by replacing the component with a component demanding a lower coverage, having a similar structure, or the like.

On Step 220 a simulation of the over-approximated hybrid system may be performed. In some exemplary embodiments, the simulation may be performed by simulating an execution of the over-approximated version of the software-under-test by the hardware-under-test, the software-under-test by the over-approximated version of the hardware-under-test, or the like.

On Step 230, the outcome of the simulation may be utilized to guide co-simulation of the hybrid system. In some exemplary embodiments, the co-simulation of the hybrid system may be performed based on a combined coverage model, such as in Step 120 of FIG. 1. In some exemplary embodiments, the outcome of the simulation may be utilized to modify the combined coverage model, to enhance the combined coverage model, or the like. Additionally or alternatively, the outcome of the simulation may comprise additional information required for the co-simulation process or portions thereof.

In some exemplary embodiments, additional coverage goals may be determined on Step 232. The additional coverage goals may be determined based on the outcome of the simulation. On Step 236, the additional coverage goals may be provided to a test generator. The test generator may be configured to generate test inputs for the software-under-test based on the combined coverage model that the co-simulation is performed based thereon, such as in Step 140 of FIG. 1. The test generator may be guided to generate the test inputs on the additional coverage goals in addition to the coverage goals of the combined coverage model.

Figure 2B:
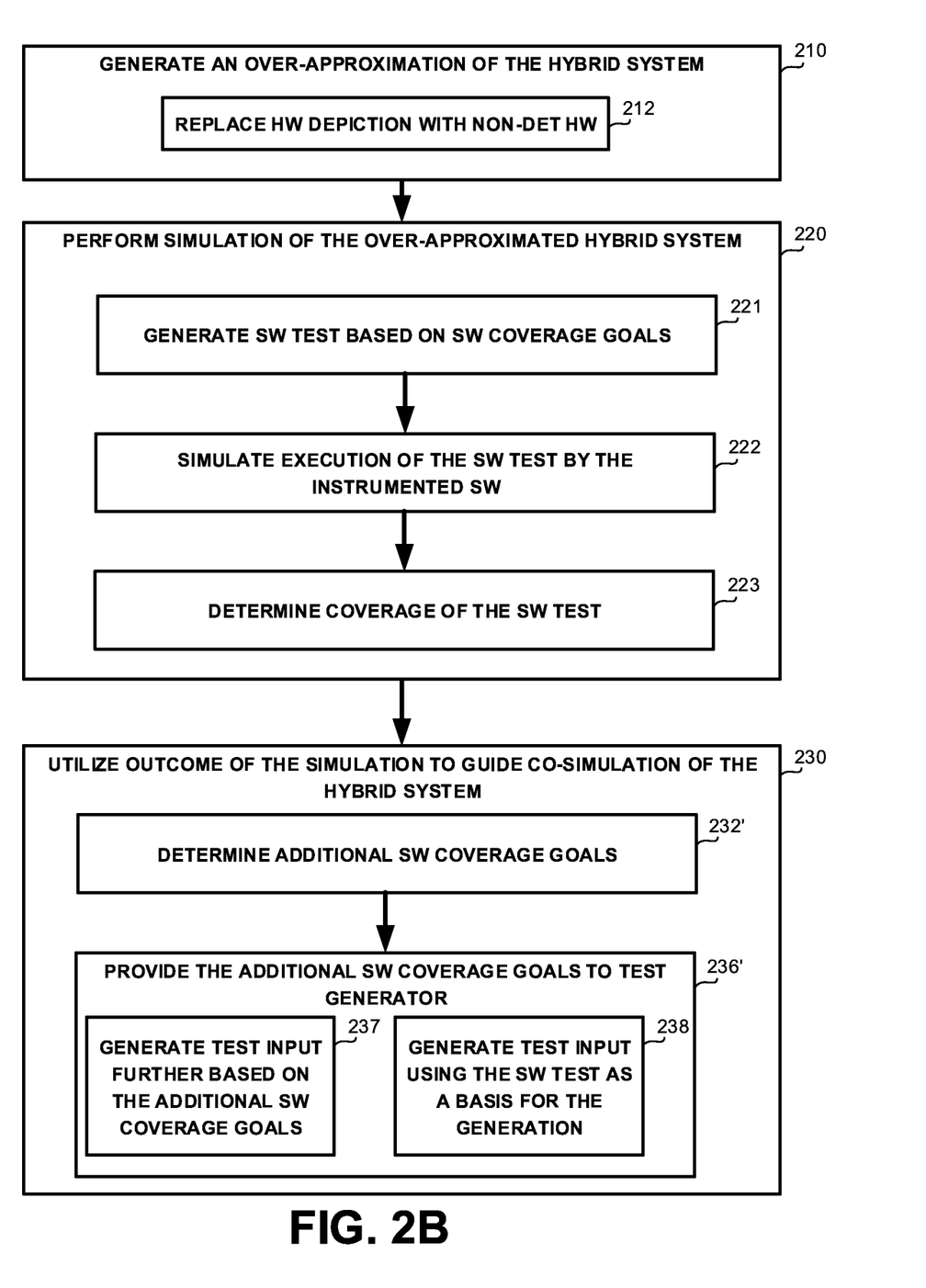

Referring now to FIG. 2B showing a flowchart diagram of a method, in accordance with some exemplary embodiments of the disclosed subject matter.

In some exemplary embodiments, on Step 210, the over-approximation of the hybrid system may be generated by over-approximating the hardware-under-test.

On Step 212, the depiction of the hardware-under-test may be replaced with a non-deterministic hardware. In some exemplary embodiments, the non-deterministic hardware may be configured to provide non-deterministic interfaces with the software-under-test. The non-deterministic hardware may be configured to return random values for the interfaces with the software-under-test. As a result, all behaviors of the interfaces between the software-under-test and the hardware-under-test are covered by the over-approximation. The over-approximation may also provide some behaviors that are not covered by the hybrid system.

In some exemplary embodiments, the simulation of the over-approximated hybrid system performed on Step 220 may be performed by simulating a stochastic (e.g., non-deterministic) execution of the software-under-test by the non-deterministic hardware.

On Step 221, a software test may be generated based on the software coverage goal. The software test may be a test input for the software-under-test. In some exemplary embodiments, the software test may be generated by a second test generator. The second test generator may be similar to the test generator utilized in Step 140 of FIG. 1. Additionally or alternatively, different test generation methods may be utilized by the second test generator to generate the software test.

On Step 222, an execution of the software test by an instrumented software may be simulated. In some exemplary embodiments, the instrumented software may be generated by instrumenting the software-under-test to check whether the coverage goals of the combined coverage model are fulfilled. The instrumented software may be generated in a process similar to the process performed on Step 130 of FIG. 1A. It may be noted that the instrumented software may be the same instrumented software utilized in Step 130 of FIG. 1A. In some exemplary embodiments, during simulating the execution of the software test, a result of a stimuli provided from the instrumented software to underlying hardware is determined non-deterministically, in order to simulate execution of the software-under-test by a non-deterministic hardware. A hardware simulator, simulating the non-deterministic hardware interfaces may be used to simulate the execution of the software test by the instrumented software.

On Step 223, a coverage of the software test may be determined. In some exemplary embodiments, software coverage events may be detected based on the software test simulation. The coverage may be determined based on the output of instrumentation routines added to the software-under-test to measure the covering of each coverage goal.

On Step 230, the outcome of the simulation may be utilized to guide co-simulation of the hybrid system. In some exemplary embodiments, the outcome of the simulation may comprise the generated software test and the coverage thereof.

On Step 232', additional software coverage goals may be determined. In some exemplary embodiments, the additional software coverage goals may be determined based on the software coverage events associated with the software test.

On Step 236', the additional software coverage goals may be provided to a test generator. In some exemplary embodiments, the software test generated on Step 220 may invoke unique paths in the software-under-test. Using the software test as input to the test generation may improve the software coverage and serve as a good starting point for co-verification of the hybrid system.

On Step 237, the test input may be generated further based on the additional software coverage goals. In some exemplary embodiments, the additional software coverage goals may be added to the combined coverage goals to obtain an expanded combined coverage goals. The test generator may be configured to generate the test input based on the expanded combined coverage goals.

Additionally or alternatively, on Step 238, the test input may be generated using the software test as a basis for the generation. The test generator may utilize the software test as a template for generating the test input. In some exemplary embodiments, the test generator, such as in the case of a test generator utilizing a fuzz testing method, may be configured to receive a sample input to be "fuzzed" to generate multiple variant inputs. The software test may be utilized as a sample input for the test generator.

Figure 2C:
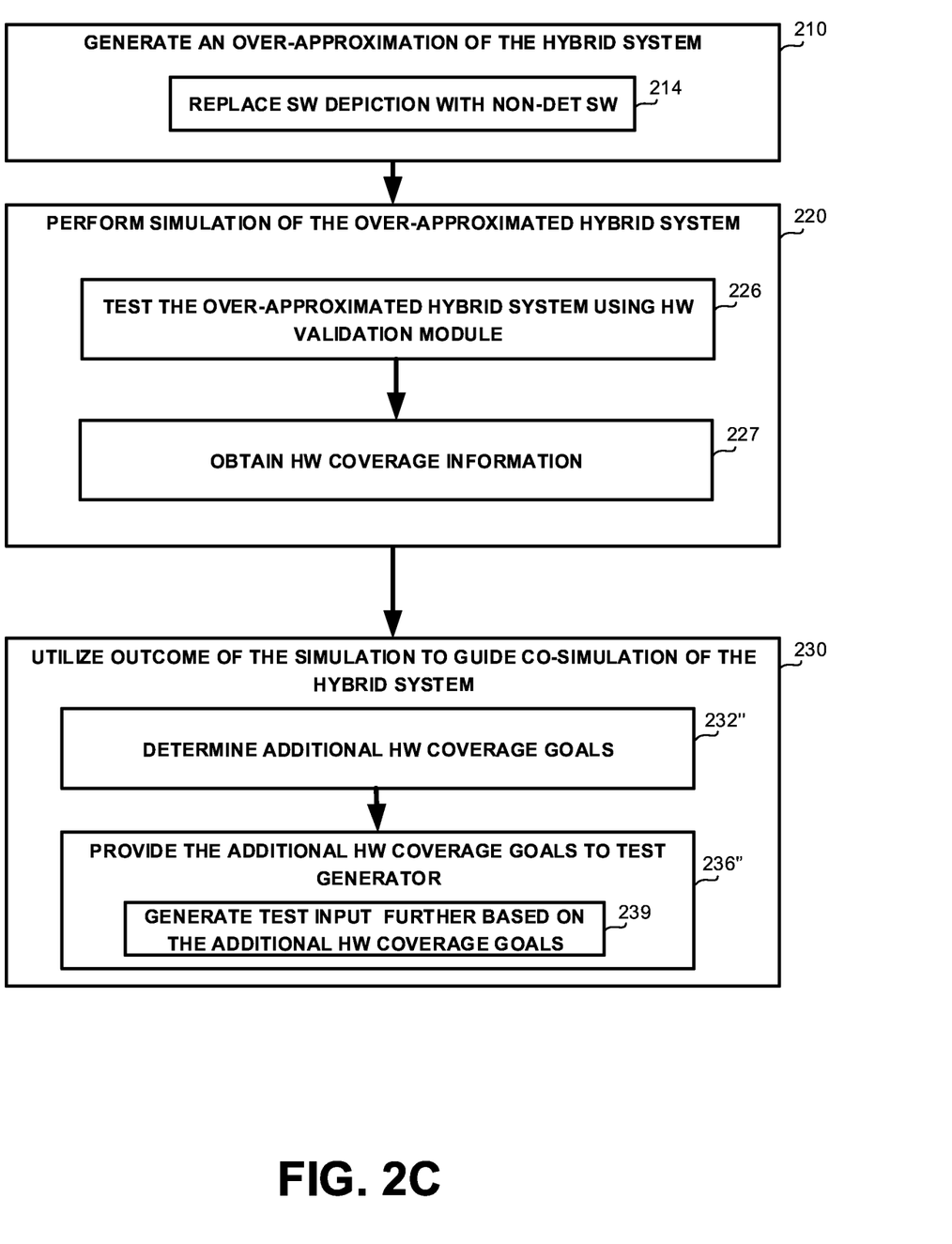

Referring now to FIG. 2C showing a flowchart diagram of a method, in accordance with some exemplary embodiments of the disclosed subject matter.

In some exemplary embodiments, on Step 210, the over-approximation of the hybrid system may be generated by over-approximating the software-under-test.

On Step 214, the depiction of the software-under-test may be replaced with a non-deterministic software. In some exemplary embodiments, the non-deterministic software may exhibit different behaviors on different runs of the same input. The non-deterministic software may utilize non-deterministic interfaces with the hardware-under-test, in order to provide non-deterministic response to the hardware-under-test. The nondeterministic software may be utilized for the over-approximation, in order to investigate coverage event of the hardware-under-test that may not be reached by the software-under-test.

In some exemplary embodiments, the simulation of the over-approximated hybrid system performed on Step 220 may be performed by simulating execution of the non-deterministic software by the hardware-under-test.

On Step 226, the over-approximated hybrid system may be tested using a hardware validation module. In some exemplary embodiments, the hardware validation module may be configured to test the over-approximated hybrid system using formal verification methods. Formal verification methods may be utilized to verify that the hardware-under-test fulfills the hardware coverage goals. Additionally or alternatively, the hardware validation module may be configured to generate hardware tests for the hardware-under-test using stimuli generator, template based generator, or the like. The hardware-under-test may be tested using the hardware tests to determine coverage of the hardware coverage goals.

On Step 227, hardware coverage information may be obtained. In some exemplary embodiments, the hardware coverage information may be determined by the hardware validation module. The hardware coverage information may be obtained in accordance with the testing method utilized by the hardware validation module. The hardware coverage information may comprise coverage events of the hardware. The coverage events may be determined based on results of the testing, assertion failure results, coverage of desired behavior of the hardware, or the like.

On Step 230, the outcome of the simulation may be utilized to guide co-simulation of the hybrid system. In some exemplary embodiments, the outcome of the simulation may comprise hardware events that are not determined by the hardware coverage goals.

On Step 232", additional hardware coverage goals may be determined. In some exemplary embodiments, the additional hardware coverage goals may be determined based on coverage events determined by testing the hardware-under-test without the software-under-test On Step 226. Some of the coverage events may not be represented by the hardware coverage goals that are associated with the execution of the software-under-test. In some exemplary embodiments, the additional coverage goals may comprise a state of the hardware-under-test as depicted in a cycle in a trace of the over-approximated hybrid system. In some exemplary embodiments, each cycle in the trace may be a coverage event that may be used as a coverage goal. In some exemplary embodiments, coverage goals generated based on the coverage events may be minimized to relate to a subset of the signals in the hardware-under-test, such as using pruning technique, cone-of-influence analysis, or the like.

On Step 236", the additional hardware coverage goals may be provided to the test generator. On Step 239, the test input may be generated further based on the additional hardware coverage goals. In some exemplary embodiments, the additional hardware coverage goals may be added to the combined coverage model as optional coverage goals. The optional coverage goals may not affect the coverage results provided for the user as results of the co-verification. However, coverage of the optional coverage goals may be determined for generating new test inputs by the test generator to enlarge the coverage of the generated tests, to generate tests that invoke interesting areas, or the like. The coverage of the generated test input may be further determined in accordance with the additional coverage goals, in order to provide a cumulative coverage information to the test generator, to generate tests in successive iterations with respect to the additional coverage goals.

Figure 3A:
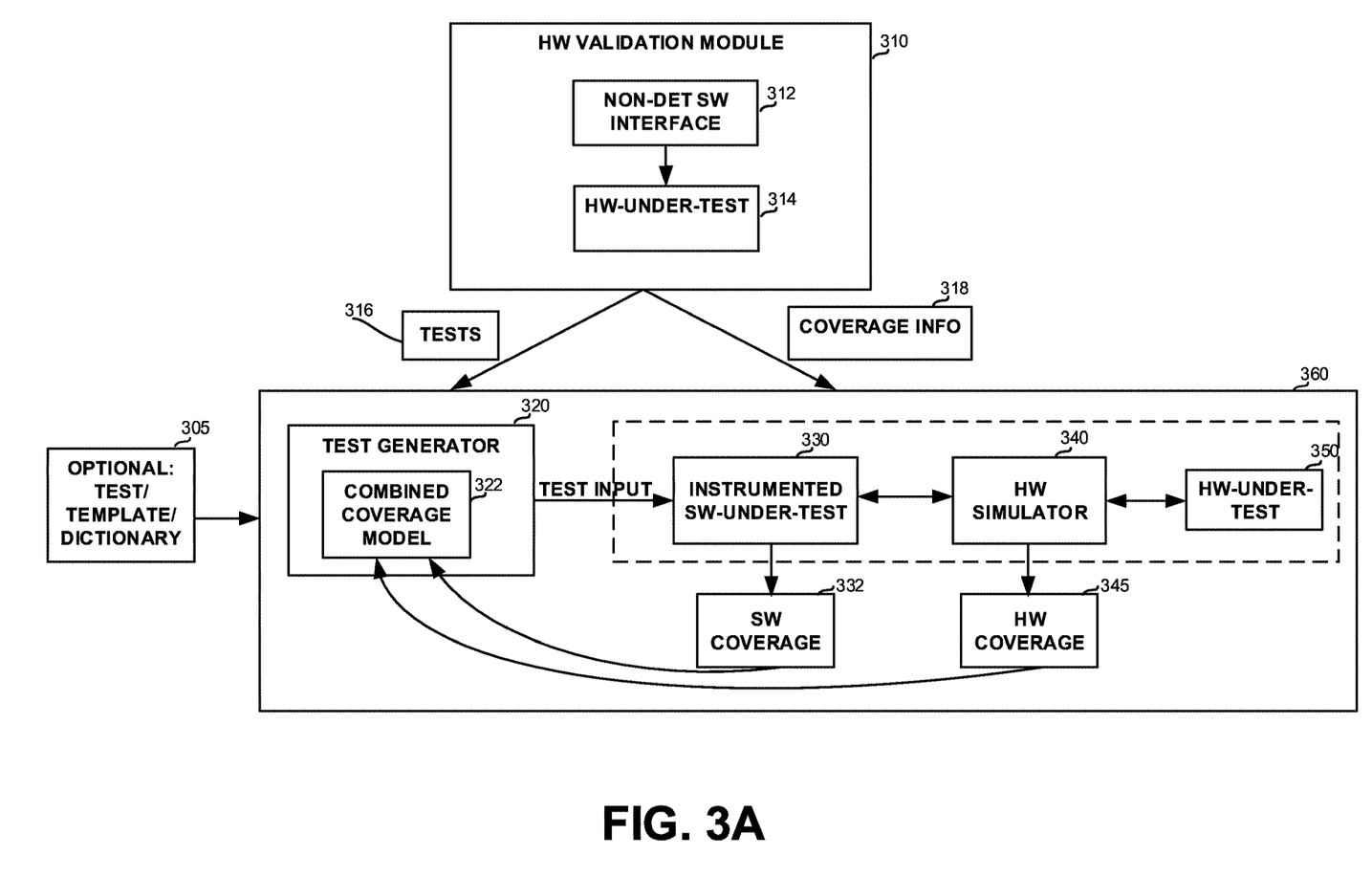
FIGS. 3A-3B show schematic illustrations of exemplary computerized environments, in accordance with some exemplary embodiments of the disclosed subject matter.

Referring now to FIG. 3A showing a schematic illustration of an exemplary computerized environment, in accordance with some exemplary embodiments of the disclosed subject matter.

In some exemplary embodiments, a hybrid system may comprise a software-under-test and a hardware-under-test that is capable of executing the software-under-test.

In some exemplary embodiments, a depiction of the hardware-under-test may be provided in a hardware depiction language. The depiction may specify the physical elements of the system utilized to perform tasks directed by software. In some exemplary embodiments, the software-under-test may be provided in a high-level programming language. The software-under-test may comprise instructions that tell the hardware-under-test how to perform a task.

In some exemplary embodiments, a Co-Verification Module 360 may be configured to verify that the hybrid system complies with the requirements thereof. In some exemplary embodiments, the requirements may be provided as a Combined Coverage Model 322 comprising coverage goals for the software-under-test and coverage goals for the hardware-under-test. The hybrid system may be co-verified based on Combined Coverage Model 322 to determine whether the software-under-test works correctly with the hardware-under-test, and whether the hardware-under-test has been properly designed to run the software-under-test successfully. The hardware and software coverage goals may be determined by a developer of the hybrid system or portions thereof, may be standard coverage goals, may be determined based on the structure of the hardware-under-test or the software-under-test, or the like.

In some exemplary embodiments, a Test Generator 320 may be configured to generate test inputs for testing the hybrid system based on Combined Coverage Model 322. Each test input may be a test input for the software-under-test. Combined Coverage Model 322 may be expanded the co-verification by adding new coverage goals invoked by Co-Verification Module 360. Test Generator 320 may be configured to produce new tests based on the coverage success rate of a test compared to the cumulative coverage of all tests run so far.

In some exemplary embodiments, Test Generator 320 may be configured to utilize fuzz testing techniques, such as genetic fuzz testing, to generate the test inputs. Test Generator 320 may be configured to provide test inputs to the software-under-test, or the instrumented version thereof, e.g., Instrumented Software 330. Test Generator 320 may then monitor the execution of the test inputs by the software-under-test for exceptions such as crashes, failing built-in code assertions, finding potential memory leaks, or the like. As an example, Test Generator 320 may be an AFL Fuzzer that employs genetic algorithms in order to efficiently increase code coverage of the test cases.

In some exemplary embodiments, Optional Input 305 may be provided to Test Generator 320. Optional Input 305 may comprise a set of tests that may be used as a starting point for the test generation, such as initial tests to be fuzzed by the fuzz testing techniques. If such tests are not provided, Test Generator 320 may be configured to start from a randomly generated test. Optional Input 305 may comprise templates for generating the test inputs, a dictionary, or the like. In some exemplary embodiments, the templates may be used as a basis for generating the test inputs, such as to generate test inputs having the same structure, or the like. Additionally or alternatively, a dictionary may provide basic tokens of the test input language. As an example, in genetic fuzz test generation, a token is used as a mutation to an existing test. A token maybe added to an existing test, may replace an existing token in a test, or the like.

In some exemplary embodiments, an Instrumented Software 330 may be obtained by instrumenting the software-under-test to identify whether the coverage goals of the software-under-test are reached during execution. The software-under-test may be instrumented to measure coverage of a specific run of the software-under-test. As an example, instructions may be added to the software-under-test at the beginning of each basic block, indicating a location and increasing a counter associated with the location when arriving to that location at the current basic block.

In some exemplary embodiments, a Hardware Simulator 340 may be configured to simulate execution of the test input by Instrumented Software 330. Hardware Simulator 340 may be configured to simulate Hardware-Under-Test 350. Stimuli provided from Instrumented Software 340 to underlying hardware may be provided to Hardware Simulator 340.

In some exemplary embodiments, execution of each generated test inputs by the hybrid system may be co-simulated. A Software Coverage 332 and a Hardware Coverage 345 may be determined based on the co-simulation of the test input. Software Coverage 332 may be a measure the degree to which the source code of the software-under-test is executed when the test input runs based on the software coverage goals. Software Coverage 332 may comprise coverage events relating to the coverage goals of the software-under-test detected using Instrumented Software 330. Hardware Coverage 345 may be a measure that the design is operating correctly and meeting the hardware coverage goals. Hardware Coverage 345 may comprise coverage events relating to the coverage goals of Hardware-Under-Test 350 detected by Hardware-Simulator 340.

In some exemplary embodiments, a coverage metrics may be used to calculate each of Software Coverage 332 and Hardware Coverage 345. As an example, a metric measuring a percentage of program subroutines and the percentage of program statements called during execution of the test input may be utilized to measure Software Coverage 332. In such an example, count instructions may be added to Instrumented Software 330 in accordance with each subroutine or statement in the software-under-test, to count the calls of these subroutines or statements during the execution. Additionally or alternatively, a coverage metric associated with Test Generator 320 may be utilized. to Instrumented Software 330 may be instrumented to calculate Software Coverage 332 in accordance with the coverage metric utilized by Test Generator 320.

In some exemplary embodiments, Hardware-Simulator 340 may be instrumented to generate Hardware Coverage 345. Hardware Coverage 345 may represent hardware simulation counters. Software Coverage 332 and Hardware Coverage 345 may be compared to a cumulative version of Combined Coverage Model 322 to improve the generated tests, such as for further fuzzing.

In some exemplary embodiments, Hardware-Simulator 340 may be compiled together with Test Generator 320. Hardware-Simulator 340 may be configured to produce source code to be compiled together with the software of Test Generator 320. In order to fetch the counters of Test Generator 320, simulation source code of Hardware-Simulator 340 may be modified in a manner that after each call to Hardware-Simulator 340, the counters are read, and Combined Coverage Model 322 is updated with the new location counters. Assertion failures in the hardware simulation may automatically kill the entire process and therefore may signal to Test Generator 320 that the current input is crashing the process (due to a software or hardware simulation fault).

Additionally or alternatively, Hardware-Simulator 340 may be executed separately. Hardware-Simulator 340 may be executed as a standalone process which exposes API via sockets, pipes, or other Inter Process Communication (IPC) mechanism. Test Generator 320 may be modified to fetch the counters via the API after each call to the hardware simulation and update the coverage metric, e.g., Combined Coverage Model 322, with the new location counters. If the hardware simulation fails due to assertion, the software of Test Generator 320 may also fail to signal to the Test Generator 320 that the given input causes a bug in the combination of the Instrumented Software 340 and simulated Hardware-Under-Test 350.

In some exemplary embodiments, Test Generator 320 may be configured to iteratively generate test inputs based on the Combined Coverage Model 322 being updated in each iteration with respect to Software Coverage 332 and Hardware Coverage 345 representing the cumulative coverage information from the last iteration. The iterations may stop when detecting a simulation failure or when achieving a full coverage of Combined Coverage Model 322. Co-Verification Module 360 may output the cumulative coverage information of the hybrid system with respect to Combined Coverage Model 322.

In some exemplary embodiments, a Hardware Validation Module 310 may be configured to perform a hardware verification of Hardware-Under-Test 350. Hardware Validation Module 310 may perform hardware verification methods on Hardware-Under-Test 350, such as formal methods, random test generation, or the like. The hardware verification methods may be performed on Hardware-Under-Test 350 as executing non-deterministic software interfaces instead of the software-under-test. As a result, Hardware Validation Module 310 may provide verification of the hardware-under-test based on the hardware coverage model.

In some exemplary embodiments, outcome of Hardware Validation Module 310 may be provided to a Co-Verification Module 360. The outcome may be utilized to guide the co-simulation of the hybrid system by Hardware Simulator 340 and the test generation by Test Generator 320.

In some exemplary embodiments, the outcome of Hardware Validation Module 310 may comprise Tests 316 produced in the testing process of the over-approximation of the hybrid system and Coverage Information 318 associated with the tests. Coverage Information 318 may comprise coverage events monitored during the testing.

In some exemplary embodiments, additional coverage goals for the hybrid system may be determined based on Coverage Information 318. The additional coverage goals may be utilized by Test Generator 320 in addition to Combined Coverage Model 322, when generating the test inputs, as additional interesting targets to be reached by the generated tests. Additionally or alternatively, the additional coverage goals may be checked by Hardware Simulator 340 when determining Hardware Coverage 345, in order to guide Co-verification Module 360 to additional coverage events of Hardware-Under-Test 350 to be invoked and verified.

Figure 3B:
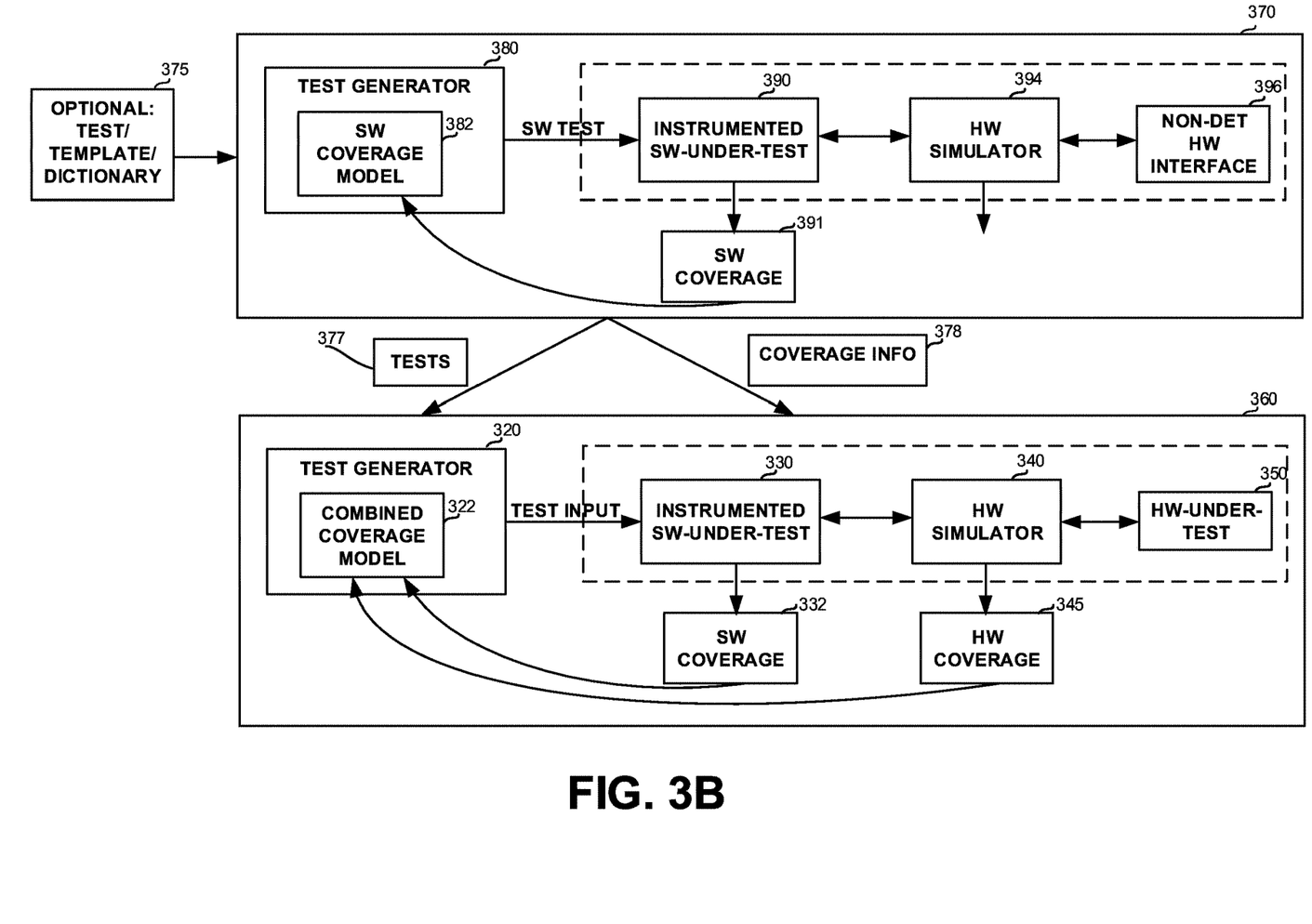

In some exemplary embodiments, Hardware Validation Module 310 may provide paths in Hardware-Under-Test 350 that are required to be covered during the verification. Each path may be associated with a sequence of inputs, which upon executing thereof the path is invoked. Temporal assertions may be added to Instrumented Software 330 to determine invoking the paths during the co-verification. Additionally or alternatively, each temporal assertion may be translated by Hardware Simulator 340 as a temporal hardware component that should be covered, such as using a hybrid automation with an invariant condition, such as Rule-Based satellites, Tableau contraction, or the like Referring now to FIG. 3B showing a schematic illustration of exemplary environment and architecture in which the disclosed subject matter may be utilized, in accordance with some exemplary embodiments of the disclosed subject matter.

In some exemplary embodiments, a Software Verification Module 370 may be configured to verify the software-under-test comprised by the hybrid system being co-verified by Co-Verification Module 360. Software Verification Module 370 may be configured to verify the software-under-test independently from the hardware-under-test, to improve the software coverage and provide a better input for Co-Verification Module 360.

In some exemplary embodiments, a Test Generator 380 may be configured to generate software tests for testing the software-under-test based on a Software Coverage Model 382. Software Coverage Model 382 may be a cumulative model that comprises the software coverage goals of the combined coverage model of the hybrid system. Additional software coverage goals may be added to Software Coverage Model 382 during the verification of the software-under-test by Software Verification Module 370.

In some exemplary embodiments, Test Generator 380 may utilize the same testing techniques as Test Generator 320, or different testing techniques, such as different fuzz testing techniques or any other software test generation technique.

In some exemplary embodiments, Test Generator 380 may utilize Input 375 as a starting point for the test generation. Input 375 may comprise templates for the software tests, sample tests, dictionaries, or the like. It may be appreciated that Optional Input 305 may be provided as Input 375.

In some exemplary embodiments, an Instrumented Software 390 may be obtained by instrumenting the software-under-test to identify whether the coverage goals of the software-under-test are reached during execution. The software-under-test may be instrumented to measure coverage of a specific run of the software-under-test. As an example, instructions may be added to the software-under-test at the beginning of each basic block, indicating a location and increasing a counter associated with the location when arriving to that location at the current basic block. Instrumented Software 390 and Instrumented Software 330 may be identical. Additionally or alternatively, additional instrumentations may be added to Instrumented Software 330 based on additional coverage goals detected by Software Verification Module 370.

In some exemplary embodiments, a Hardware Simulator 394 may be configured to simulate execution of the software test by Instrumented Software 390. Hardware Simulator 394 may be configured to simulate Non-Deterministic Hardware Interface 396. Stimuli provided from Instrumented Software 390 to underlying hardware may be determined non-deterministically by Hardware Simulator 394.

In some exemplary embodiments, a Software Coverage 391 may be determined based on the simulation of the software test. Software Coverage 391 may be a measure the degree to which the source code of the software-under-test is executed when the software test runs based on the software coverage goals. Software Coverage 391 may comprises coverage events relating to the coverage goals of the software-under-test detected using Instrumented Software 390.

In some exemplary embodiments, the outcome of Software Verification Module 370 may be provided to a Co-Verification Module 360. The outcome may be utilized to guide the co-simulation of the hybrid system by Hardware Simulator 340 and the test generation by Test Generator 320.

In some exemplary embodiments, the outcome of Software Verification Module 370 may comprise Tests 377 generated by Test Generator 380 and Coverage Information 378 associated with the tests. Coverage Information 378 may comprise software coverage events monitored during the testing.

In some exemplary embodiments, additional coverage goals for the hybrid system may be determined based on Coverage Information 378. The additional coverage goals may be utilized by Test Generator 320 in addition to Combined Coverage Model 322, when generating the test inputs, as additional interesting targets to be reached by the generated tests. Additionally or alternatively, additional instrumentations may be added to Instrumented Software 330 based on the additional coverage goals, to determine whether the additional coverage goals are fulfilled by the hybrid system.

Additionally or alternatively, Tests 377 may be utilized as sample inputs or templates by Test Generator 320, in addition or instead of Optional Input 305. Test Generator 320 may be configured to generate the test inputs by modifying one or more of Tests 377. An improved initial starting point may be provided to Test Generator 320 based on Tests 377 and their corresponding Coverage Information 378.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a combined coverage model for a system, wherein the system comprises a software-under-test and a hardware-under-test that is capable of executing the software-under-test, wherein the combined coverage model comprises coverage goals for the software-under-test and coverage goals for the hardware-under-test;
    performing a co-simulation of the system based on the combined coverage model, wherein said performing the co-simulation comprises:
        instrumenting the software-under-test to identify whether the coverage goals of the software-under-test are reached during execution, whereby obtaining an instrumented software;
        generating a test input by a test generator, wherein said generating is based on the combined coverage model, wherein the test input is a test input for the software-under-test;
        simulating execution of the test input by the instrumented software, wherein during said simulating, stimuli provided from the instrumented software to underlying hardware is provided to a hardware simulator that is configured to simulate the hardware-under-test;
        determining a coverage of the execution of the test input, wherein said determining the coverage comprises detecting, using the instrumented software, coverage events relating to the coverage goals of the software-under-test and detecting, using the hardware simulator, coverage events relating to the coverage goals of the hardware-under-test; and wherein said generating, executing and determining are performed repeatedly, wherein a determined coverage in an iteration is utilized in said generating in a successive iteration;

obtaining an over-approximation of the system, wherein the over-approximation of the system over-approximates one of the software-under-test and hardware-under-test;

wherein the over-approximation of the system over-approximates the hardware-under-test, wherein the over-approximation comprises a non-deterministic hardware instead of the hardware-under-test;

wherein said performing the simulation further comprises:

generating a software test input by a second test generator, wherein said generating the software test input is based on the coverage goals for the software-under-test;

simulating execution of the software test input by the instrumented software, wherein during said simulating, a result of a stimuli provided from the instrumented software to underlying hardware is determined non-deterministically;

determining a coverage of the execution of the software test input, wherein said determining the coverage of the execution of the software test input comprises detecting, using the instrumented software, additional coverage events relating to the coverage goals of the software-under-test;

performing simulation of the over-approximation of the system; and utilizing an outcome of the simulation to guide the co-simulation of the system, wherein said utilizing the outcome comprises utilizing the software test input and the coverage of the execution of the software test input in said generating the test input during the co-simulation.

2. The method of claim 1, wherein said utilizing comprises determining, based on the outcome of the simulation, additional coverage goals for the system, wherein the test generator is guided to generate the test input further based on the additional coverage goals.

3. The method of claim 1, wherein said utilizing the outcome comprises:

determining, based on the coverage of the execution of the software test input, additional coverage goals for the software-under-test; and wherein said generating the test input is performed based on the combined coverage model and the additional coverage goals.

4. The method of claim 1, wherein said generating the test input is performed based on the software test input, wherein the test generator is configured to generate the test input by modifying the software test input, whereby providing an improved initial starting point for the co-simulation based on the software test input.

5. A computer program product comprising a non-transitory computer readable storage medium retaining program instructions, which program instructions when read by a processor, cause the processor to perform a method comprising:

obtaining a combined coverage model for a system, wherein the system comprises a software-under-test and a hardware-under-test that is capable of executing the software-under-test, wherein the combined coverage model comprises coverage goals for the software-under-test and coverage goals for the hardware-under-test;

performing a co-simulation of the system based on the combined coverage model, wherein said performing the co-simulation comprises:

instrumenting the software-under-test to identify whether the coverage goals of the software-under-test are reached during execution, whereby obtaining an instrumented software;

generating a test input by a test generator, wherein said generating is based on the combined coverage model, wherein the test input is a test input for the software-under-test;

simulating execution of the test input by the instrumented software, wherein during said simulating, stimuli provided from the instrumented software to underlying hardware is provided to a hardware simulator that is configured to simulate the hardware-under-test;

determining a coverage of the execution of the test input, wherein said determining the coverage comprises detecting, using the instrumented software, coverage events relating to the coverage goals of the software-under-test and detecting, using the hardware simulator, coverage events relating to the coverage goals of the hardware-under-test; and wherein said generating, executing and determining are performed repeatedly, wherein a determined coverage in an iteration is utilized in said generating in a successive iteration obtaining an over-approximation of the system, wherein the over-approximation of the system over-approximates one of the software-under-test and hardware-under-test;

wherein the over-approximation of the system over-approximates the hardware-under-test, wherein the over-approximation comprises a non-deterministic hardware instead of the hardware-under-test;

wherein said performing the simulation further comprises:

generating a software test input by a second test generator, wherein said generating the software test input is based on the coverage goals for the software-under-test;

simulating execution of the software test input by the instrumented software, wherein during said simulating, a result of a stimuli provided from the instrumented software to underlying hardware is determined non-deterministically;

determining a coverage of the execution of the software test input, wherein said determining the coverage of the execution of the software test input comprises detecting, using the instrumented software, additional coverage events relating to the coverage goals of the software-under-test;

performing simulation of the over-approximation of the system; and utilizing an outcome of the simulation to guide the co-simulation of the system, wherein said utilizing the outcome execution of the software test input in said generating the test input during the co-simulation.

6. The computer program product of claim 5, wherein said utilizing comprises determining, based on outcome of the simulation, additional coverage goals for the system, wherein the test generator is guided to generate the test input further based on the additional coverage goals.

7. The computer program product of claim 5, wherein said utilizing the outcome comprises:
determining, based on the coverage of the execution of the software test input, additional coverage goals for the software-under-test; and
wherein said generating the test input is performed based on the combined coverage model and the additional coverage goals.

8. The computer program product of claim 5, wherein said generating the test input is performed based on the software test input, wherein the test generator is configured to generate the test input by modifying the software test input, whereby providing an improved initial starting point for the co-simulation based on the software test input.

9. An apparatus comprising said processor and a memory, wherein said memory retaining
a computer program product comprising a non-transitory computer readable storage medium retaining program instructions, which program instructions when read by a processor, cause the processor to perform a method comprising:
obtaining a combined coverage model for a system, wherein the system comprises a software-under-test and a hardware-under-test that is capable of executing the software-under-test, wherein the combined coverage model comprises coverage goals for the software-under-test and coverage goals for the hardware-under-test;
performing a co-simulation of the system based on the combined coverage model, wherein said performing the co-simulation comprises:
instrumenting the software-under-test to identify whether the coverage goals of the software-under-test are reached during execution, whereby obtaining an instrumented software;
generating a test input by a test generator, wherein said generating is based on the combined coverage model, wherein the test input is a test input for the software-under-test;
simulating execution of the test input by the instrumented software, wherein during said simulating, stimuli provided from the instrumented software to underlying hardware is provided to a hardware simulator that is configured to simulate the hardware-under-test;
determining a coverage of the execution of the test input, wherein said determining the coverage comprises detecting, using the instrumented software, coverage events relating to the coverage goals of the software-under-test and detecting, using the hardware simulator, coverage events relating to the coverage goals of the hardware-under-test; and
wherein said generating, executing and determining, are performed repeatedly, wherein a determined coverage in an iteration is utilized in said generating in a successive iteration
obtaining an over-approximation of the system, wherein the over-approximation of the system over-approximates one of the software-under-test and hardware-under-test;
wherein the over-approximation of the system over-approximates the hardware-under-test, wherein the over-approximation comprises a non-deterministic hardware instead of the hardware-under-test;
wherein said performing the simulation further comprises:
generating a software test input by a second test generator, wherein said generating the software test input is based on the coverage goals for the software-under-test;
simulating execution of the software test input by the instrumented software, wherein during said simulating, a result of a stimuli provided from the instrumented software to underlying hardware is determined non-deterministically;
determining a coverage of the execution of the software test input, wherein said determining the coverage of the execution of the software test input comprises detecting, using the instrumented software, additional coverage events relating to the coverage goals of the software-under-test;
performing simulation of the over-approximation of the system; and
utilizing, an outcome of the simulation to guide the co-simulation of the system, wherein said utilizing the outcome comprises utilizing the software test input and the coverage of the execution of the software test input in said generating the test input during the co-simulation.

* * * * *